(12) United States Patent
Huckins

(10) Patent No.: US 6,359,656 B1
(45) Date of Patent: Mar. 19, 2002

(54) IN-BAND SYNCHRONIZATION OF DATA STREAMS WITH AUDIO/VIDEO STREAMS

(75) Inventor: Jeffrey L. Huckins, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/772,161

(22) Filed: Dec. 20, 1996

(51) Int. Cl.[7] .................. H04N 11/04; H04N 11/00; H04N 9/475; H04L 25/00; H04L 7/06; H04J 3/06

(52) U.S. Cl. ............... 348/512; 348/423; 348/845.2; 348/515; 348/460; 370/503; 370/509; 370/468; 370/473; 375/364; 375/365; 375/366; 375/216

(58) Field of Search .................. 348/423, 845.2, 348/845.3, 515, 512, 460, 465, 474; 375/364, 365, 366, 216; 370/503, 509, 468, 473, 389; 345/723, 719, 726, 302

(56) References Cited

U.S. PATENT DOCUMENTS

| | | | | |
|---|---|---|---|---|
| 5,420,866 A | * | 5/1995 | Wasilewski | 370/110.1 |
| 5,467,342 A | * | 11/1995 | Logston et al. | 370/253 |
| 5,517,250 A | * | 5/1996 | Hoogenboom et al. | 348/451 |
| 5,537,409 A | * | 7/1996 | Moriyama et al. | 348/423 |
| 5,541,662 A | * | 7/1996 | Adams et al. | 348/460 |
| 5,598,352 A | * | 1/1997 | Rosenau et al. | 348/512 |
| 5,640,388 A | * | 6/1997 | Woodhead et al. | 348/464 |
| 5,850,501 A | * | 12/1998 | Yanagihara | 386/112 |
| 5,856,973 A | * | 1/1999 | Thompson | 370/389 |
| 5,966,387 A | * | 10/1999 | Cloutier | 370/516 |

* cited by examiner

Primary Examiner—Reinhard J. Eisenzopf
Assistant Examiner—Paulos Natnael
(74) Attorney, Agent, or Firm—Kenyon & Kenyon

(57) ABSTRACT

Control information is processed in synchronism with audio and video data according to a protocol such as RTP (Real-time Transfer Protocol). In one embodiment, a payload handler receives incoming data packets and forwards them to either a data control filter or an audio packet handler. The data control filter determines whether the data payload contains video data or control information and forwards video data to a video data packet handler and data control information to a data handler. The data control information can include an action identifier field (e.g., containing a "display" command) and a data object field (e.g., identifying a file location in a memory) so that the data control filter can display the identified file with the presentation of the other video and audio data. Because the data control information is passed "in-stream" with the audio and video data packets, the payload handler is able to synchronize the presentation of audio and video data with the data event referenced by the data control information.

16 Claims, 7 Drawing Sheets

IN-BAND SYNCHRONIZATION OF DATA STREAMS WITH AUDIO/VIDEO STREAMS

BACKGROUND OF THE INVENTION

The present invention pertains to a method and apparatus for synchronizing data streams with audio/video streams, and more particularly, to a method and apparatus for synchronizing a presentation of audio and/or video with the execution of data control information.

Referring to FIG. 1, a known system for rendering audio and video streams is shown. A central processing unit (CPU) 1 executes application code typically stored in a memory 9. CPU 1 is coupled to a host bus 3 which is coupled to memory 9 via a first bridge circuit 5 (also referred to as a host bridge circuit or a north bridge circuit). The first bridge circuit is, in turn, coupled to a first bus 7, such as a bus operating according to the Peripheral Component Interconnect specification (PCI Special Interest Group, P.O. Box 14070, Portland, Oreg. 97214). A second bus 11, such as an expansion bus, is coupled to the PCI bus 7 via a second bridge circuit 10 (also referred to as a south bridge circuit). A modulator/demodulator (modem) 13 is coupled to the expansion bus 11 and is adapted to receive data from a transmission medium 110 (e.g., so-called plain old telephone service (POTS) lines or the Internet system). In FIG. 1, a client 100 is adapted to receive data from a server 120 via transmission medium 110. In current applications, this data can be audio and/or video (A/V) data that is transferred using the so-called Real-time Transfer Protocol (RTP). Under the RTP protocol, data such as A/V data is transferred from transmission medium 110 to the client as packets and are processed by an A/V subsystem 15 coupled to the PCI bus 7.

An example of such an A/V subsystem 15 is shown in FIG. 2. Referring to FIG. 2, the incoming RTP data packets are received at a packet preparation module/payload handler 18. The RTP protocol is defined by the Internet Engineering Task Force (IETF) and provides an end-to-end network transport function suitable for applications transmitting real-time data over multicast or unicast network services. Payload handler 18 analyzes each incoming RTP data packet by reading RTP header information and "stripping" this data off of the packets. An exemplary RTP data packet 50 is shown in FIG. 3. Each RTP header includes a variety of information, such as a Payload Type field that identifies the type of information contained in the RTP packet (e.g., a specific type of video or audio data). A Marker Bit (M) can be provided to identify whether the RTP packet 50 contains the end of a current frame of video data. The RTP header 51 also includes a Timestamp field that is used to synchronize audio and video data appearing as a data payload 52 in the RTP data packet 50.

The payload handler 18 determines whether the data payload 52 contains audio or video data and forwards it to the appropriate data packet handler (e.g., video data packet handler 20 and audio data packet handler 22). Video data packet handler 20 and audio data packet handler 22 can be coupled to the payload handler 18 directly or can be coupled indirectly (e.g., through bus 7). Therefore, video data packet handler 20 receives a stream of video data packets and audio data packet handler 22 receives a stream of audio data packets. Payload handler 18 controls synchronization of the audio and video data packet streams via the timestamp field appearing in RTP header 51. Accordingly, audio data that is synchronized to a specific frame of video data are sent approximately at the same time to the respective data packet handlers 20, 22.

Video data packet handler 20 analyzes video packets that can have a format according to any of a variety of compression algorithms. Typical compression algorithms include any of a variety of block transform based video compression algorithms such as H.261 (International Telecommunication Union—Telecommunications Standardization Sector (ITU-T), March, 1993), H.263 (ITU-T, Dec. 5, 1995), JPEG ("Joint Photographic Expert Group")(International Organization for Standardization/International Electrotechnical Commission ("ISO/IEC") 10918-1), MPEG-I and MPEG-II ("Motion Picture Expert Group")(ISO/IEC 11172-2 and 13818-2). The video data packet handler 20 includes a coder/decoder (codec) where the decoder portion of the codec is responsible for converting the compressed video data from the video packet into raw, uncompressed video data for video rendering device 23, which transfers this data to an output device such as display 24. The audio data packet handler 22 works in a similar manner in that received data packets are converted into digital audio data and passed to an audio rendering device 25 that converts the digital data to analog data for output at a speaker 26.

The A/V subsystem 15 can also be used as an input device (e.g., in a video phone application). A camera 28 is provided coupled to a video capture component 29 which supplies frames of uncompressed data to video data packet handler 20 at a rate of approximately 30 frames per second. As stated above, the video data packet handler 20 includes a codec and the coder portion of the codec is used to compress the video frame data according to a video compression algorithm. The video data packets generated by the video packet handler 20 are passed to the packet preparation module/payload handler 18 which creates RTP packets for transport to the end-user (e.g. over transmission medium 110 in FIG. 1). Accordingly, a microphone 27 can be provided which supplies input analog audio data to audio rendering device 25. Audio rendering device 25 converts the analog audio signals into digital signals for the audio data packet handler that creates audio data packets for payload handler 18. Payload handler 18 uses the audio data packets to create RTP packets for transport to the end-user.

The A/V subsystem 15 controls the synchronization of the presentation of audio and video data. However data control information other than traditional audio and video data is sent outside of the RTP protocol (if it is sent at all) and is not synchronized with the A/V data streams. It would be desirable to synchronize the presentation of data objects pursuant to data control information for a more complete and accurate presentation of information to an end-user.

SUMMARY OF THE INVENTION

According to an embodiment of the present invention, a payload handler is provided adapted to receive a plurality of data packets, each of the data packets including a data payload including either video data or data control information, a first header including a timestamp field, and a data control header identifying a type of data contained in the data payload. A data control filter coupled to the payload handler can receive the data control header and data payload for each of the data packets. The data control filter passes data payloads including data control information to a data handler and data payloads including video data to a video data packet handler. The data control information includes a command in an action identifier field which is executed by the data handler. The payload handler synchronizes a transfer of the video data and data control information to the data control filter based on information in the timestamp field of the data packet header.

DETAILED DESCRIPTION

Figure 2:
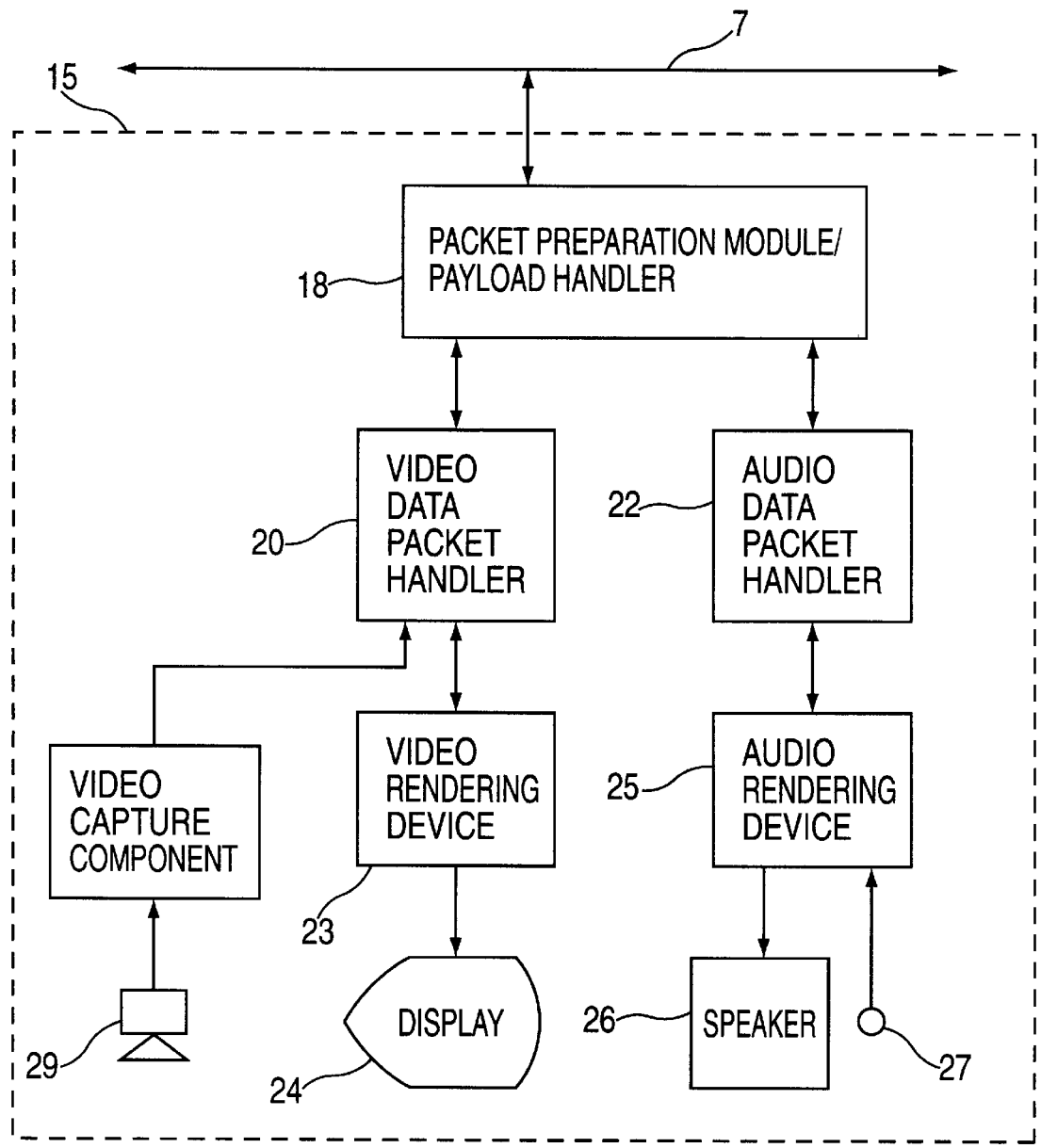
FIG. 2 is a block diagram of a audio/video subsystem as is known in the art.
Figure 3:
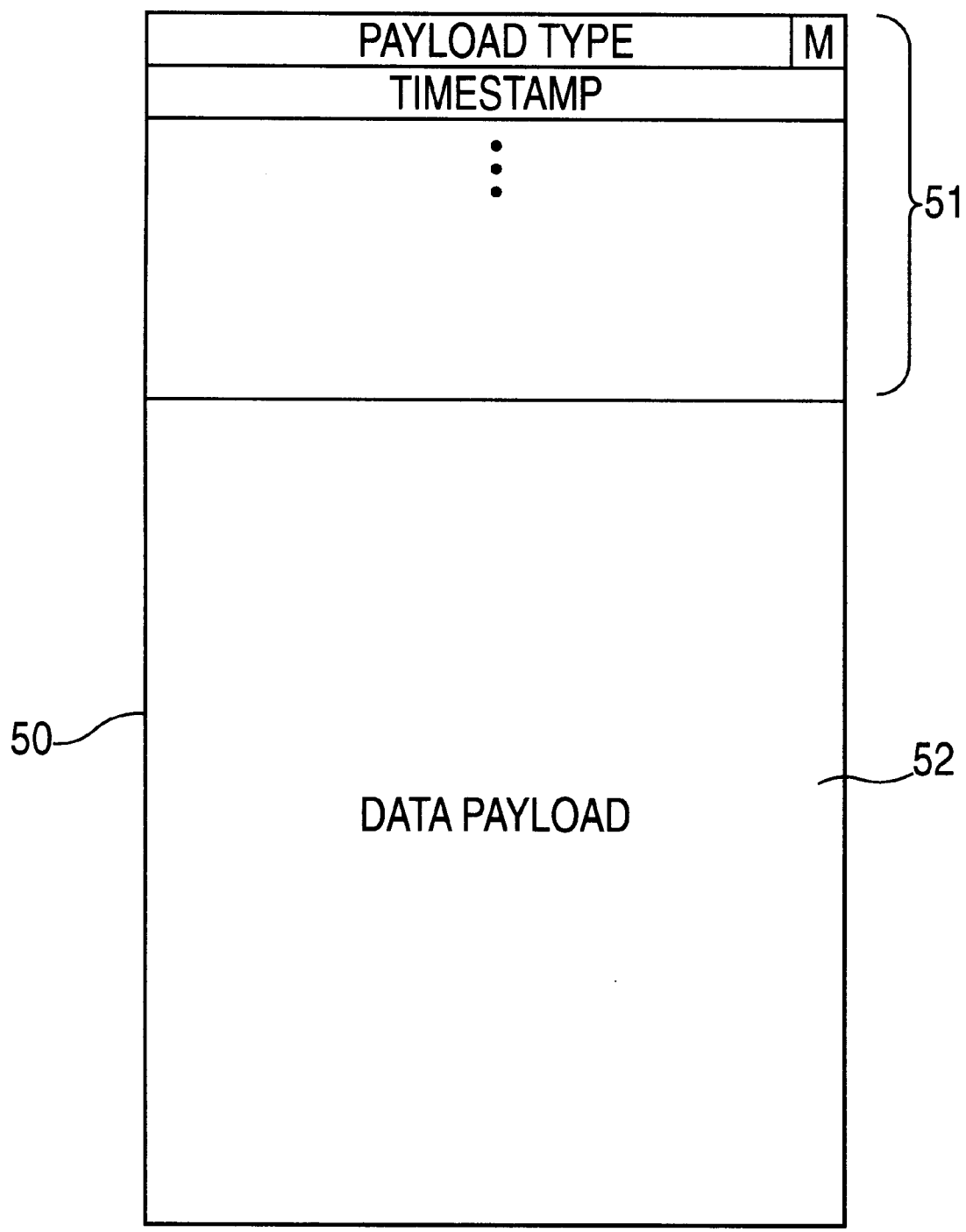
FIG. 3 shows a sample RTP packet as is known in the art.
Figure 4:
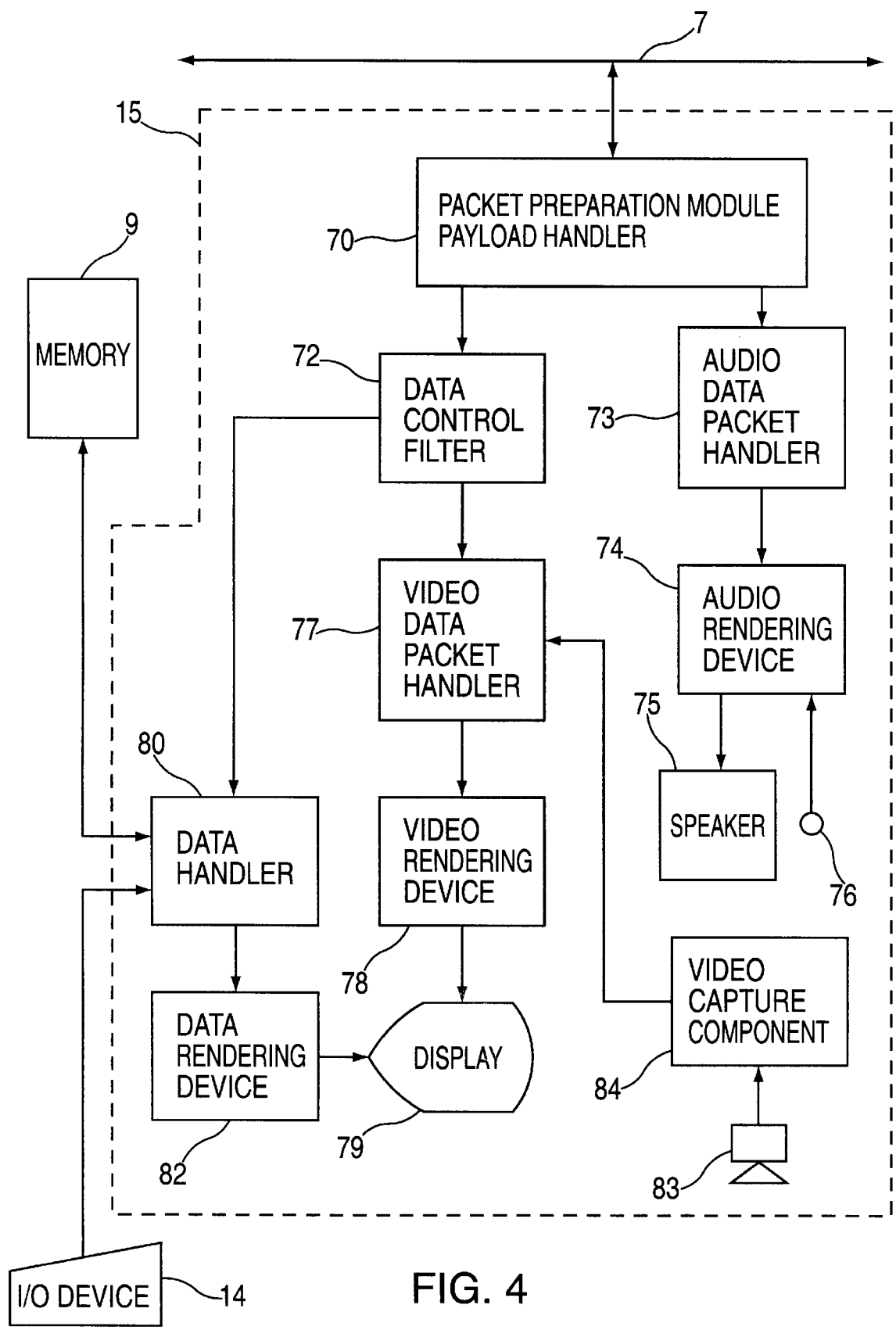
FIG. 4 is a block diagram of an audio/video subsystem constructed according to an embodiment of the present invention.
Figure 5:
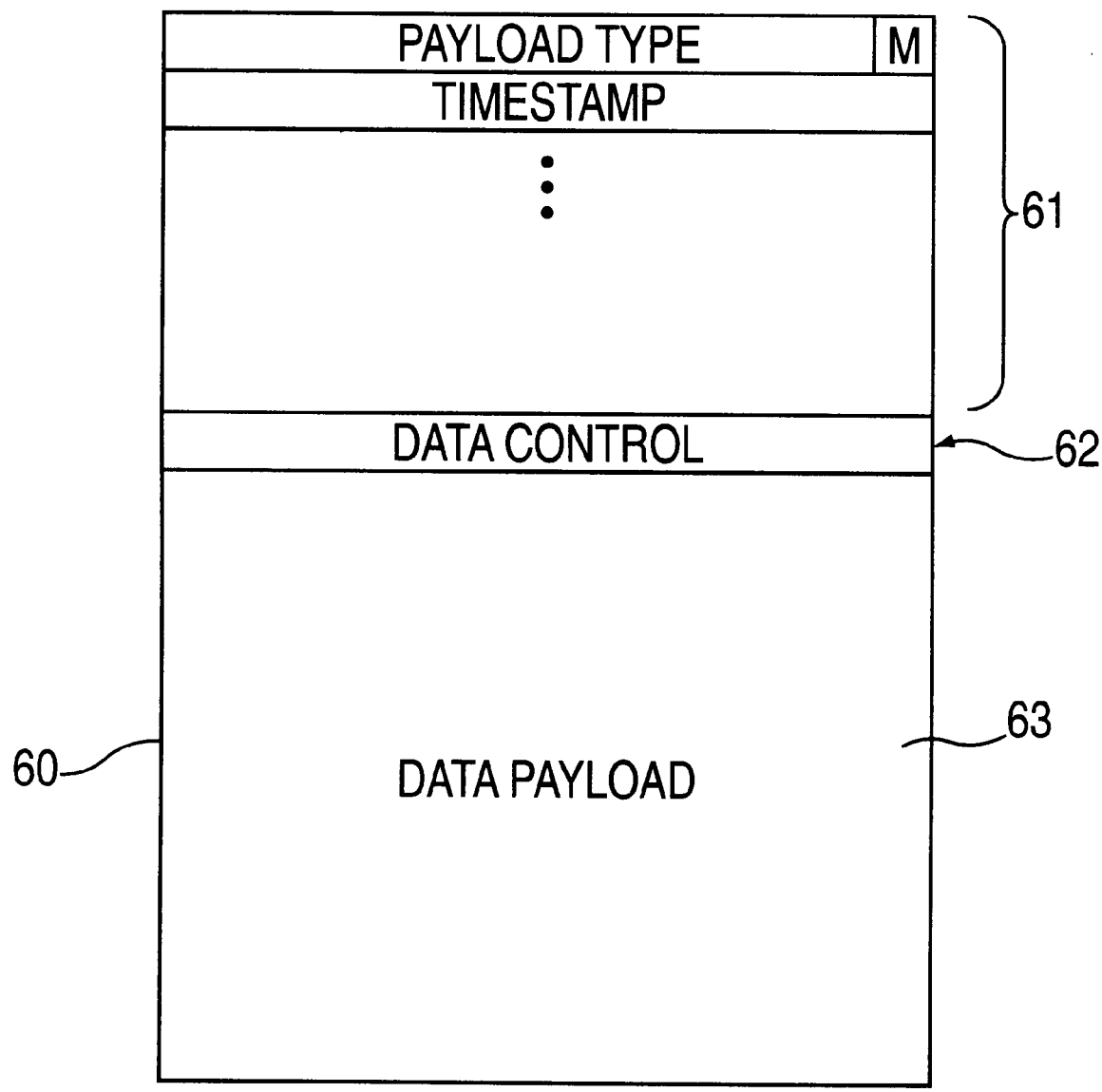
FIG. 5 shows an RTP packet having a format according to an embodiment of the present invention.

Referring to FIG. 4, a general block diagram of an A/V subsystem 15' constructed according to an embodiment of the present invention is shown. The A/V subsystem 15' can be coupled to the PCI bus 7 (shown in FIG. 1) and includes a packet preparation module/payload handler 70 that receives data packets (e.g., RTP data packets) and analyzes the header information. Referring to FIG. 5, an example of an RTP data packet 60 having a construction according to an embodiment of the present invention is shown. The RTP data packet 60 includes an RTP header 61 having a format similar to the RTP header 51 of FIG. 3. Payload handler 70 analyzes the RTP information (e.g., the RTP header 61), and strips this data off of the data packet. If the payload type field of the RTP header 61 indicates that the data packet contains video data, then that data packet is sent to a data control filter 72, and if the payload type field indicates audio data, then that data packet is sent to an audio data packet handler 73. If the data packet is an audio data packet, it is handled in the same manner as described with respect to FIG. 2. The header information of the audio data packet is analyzed and stripped off and the remaining digital audio data is transferred to an audio rendering device 74 which may include a coder/decoder or the like to convert the digital signal into an audio signal for a speaker 75.

Data control filter 72 analyzes a data control field 62 (FIG. 5) in the portion of the RTP data packet 60 that it receives to determine whether the data payload 63 contains data control information or video data. Data control field 62 can be as small as one bit (e.g., 1 indicating data control information and 0 indicating video data), but may be larger in order to have the beginning of the subsequent data payload 63 fall on a specific boundary (e.g., a byte or word boundary). If data payload 63 includes video data, it is sent to a video data packet handler 77 where the packet header is analyzed, such as an H.263 packet header, and used to convert the compressed video data (i.e., by using a codec) into a form that can be handled by the video rendering device 78. The uncompressed video data can then be displayed at display 79.

Figure 6:
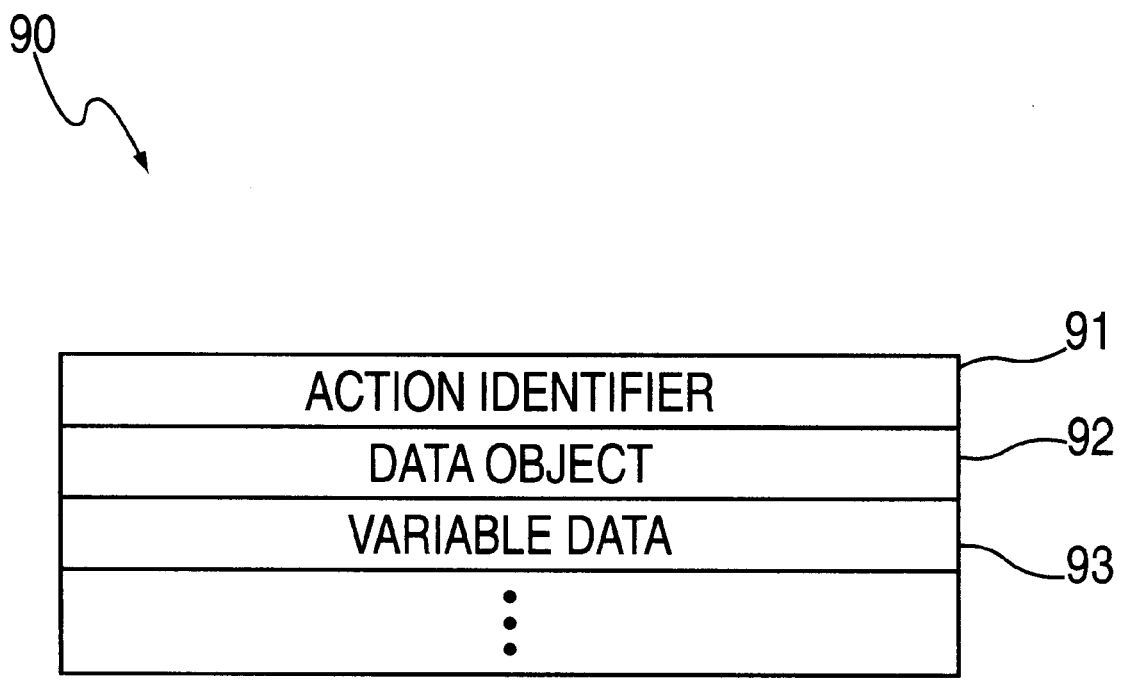
FIG. 6 shows a format for data control information according to an embodiment of the present invention.

If the data payload includes data control information (as indicated by the data control field 62), it is sent to a data handler 80 where the data control information is converted into the user requested information. In this embodiment, the data control information can be a semantic or data packet that signals a data event that is to take place. For example, a video slide prepared by the PowerPoint® application (Microsoft Corporation, Redmond, Wash.) could be identified by the data control information. In response to this data control information, data handler 80 retrieves the requested file from a data source such as memory 9 (FIG. 1) and presents it to a data rendering device 82 which converts the file into displayable format for display 79. The data control information describes a data event that is to take place. In addition to identifying a file to be displayed (e.g., a video slide), the data control information can be a command as well. An exemplary format for data control information 90 is shown in FIG. 6. An action identifier field 92 (or command field) can be provided to store a command such as "display" (e.g., display a file), "move" (e.g., move a graphical object), "query" (e.g., query the status of a procedure), etc. Such a command would be executed by data handler 80. A data object field 91 can be provided to identify the data that is to be acted upon including, for example, the location of the file (e.g., buffer location in memory 9 or file name). Furthermore, a variable data field 93 can be provided to supply variable data for a given command (e.g., "move" a graphical object "10" pixel locations to the right). A further description of data control information data packets can be found in the U.S. Patent Application entitled "Remote Streaming of Semantics for Varied Multimedia Output" by Jeffrey L. Huckins and filed on Dec. 18, 1996, (now U.S. Pat. No. 5,890,162) the disclosure of which is hereby incorporated by reference in its entirety.

As described above, the data control information is included in RTP packets with the audio and video data packets. Therefore, the data control information is also synchronized with the audio and video data in that they are transferred to the audio/video subsystem 15' in RTP packets synchronized with the audio and video data packets. Since each RTP header 61 (FIG. 5) includes a timestamp field, the payload handler 70 (FIG. 4) is able to forward the data control information packet to the data control filter 72 at the appropriate time relative to the video and audio data packets. This results in an improved presentation of data to an end-user allowing for more data (e.g., the display of identified files) to be presented to the end-user in synchronization with other audio and video data.

Figure 7:
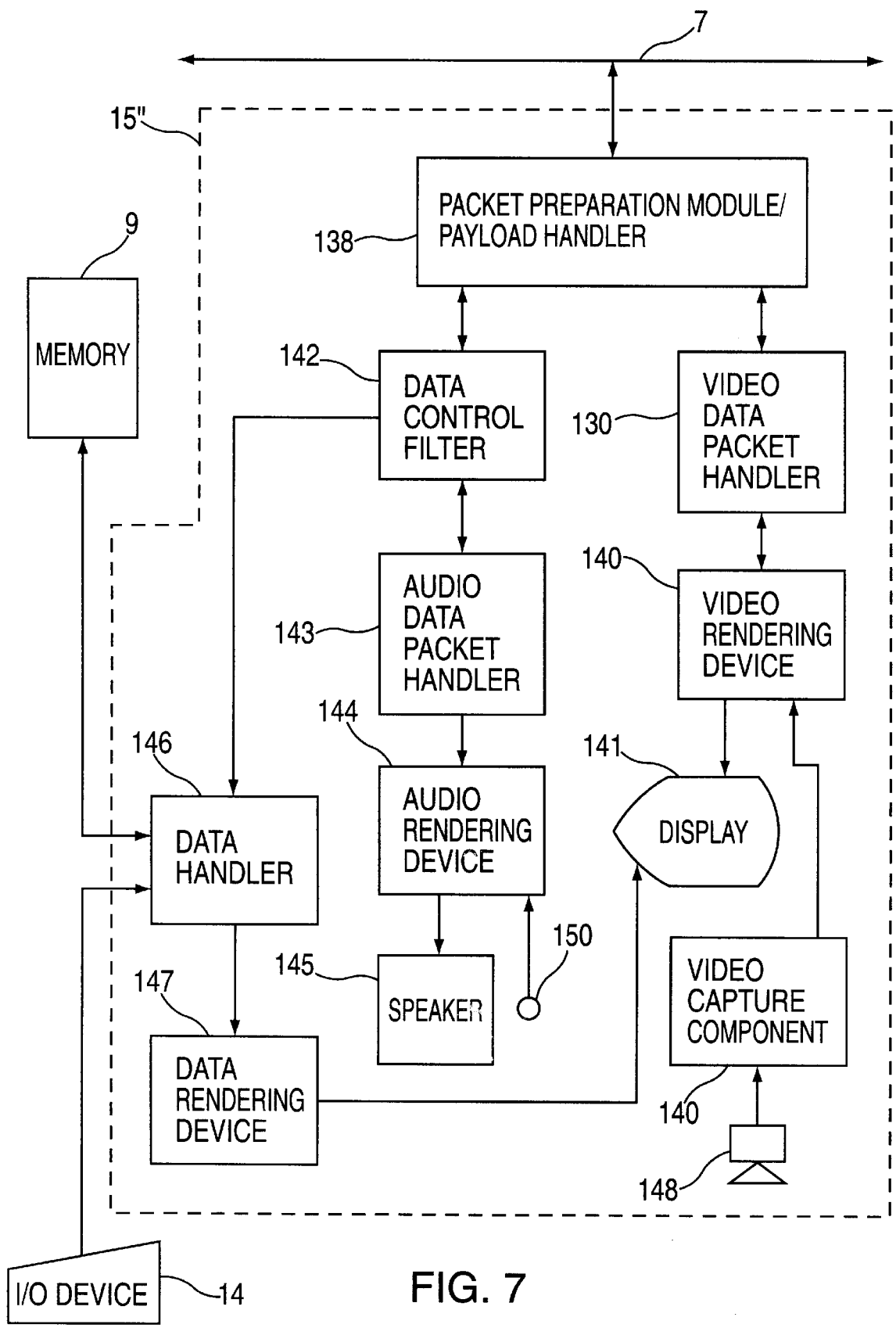
FIG. 7 is a block diagram of a second audio/video subsystem constructed according to an embodiment of the present invention.

Referring to FIG. 7, a second embodiment of the audio/video subsystem 15" of the present invention is shown. The audio/video subsystem 15" of FIG. 7 is similar in operation to the audio/video subsystem 15' of FIG. 4 except that data control information is placed in the audio data stream instead of the video data stream. The RTP data packets are received at a packet preparation module/payload handler 138 and video data packets are passed to a video data packet handler 139 which decompresses the video packet so that it can be presented at display 141 via video rendering device 140. Audio packets and data control information are transferred to data control filter 142 which analyzes the data control field 62 of the packet (FIG. 5). If the data payload 63 is an audio packet it is passed to audio data packet handler 143 where the packet header information is stripped off from the digital data. The data is then converted to analog form by audio rendering device 144 and output to speaker 145. If the data packet includes data control information, it is transferred to data handler 146 and processed as described above. For example, if the data control information has an action identifier field 92 (FIG. 6) indicating that a file is to be displayed and the data object field 91 identifies a file location in memory 9, the identified file is retrieved from memory 9 and passed to data rendering device 147 which converts the file into a format for presentation at display 141.

Figure 1:
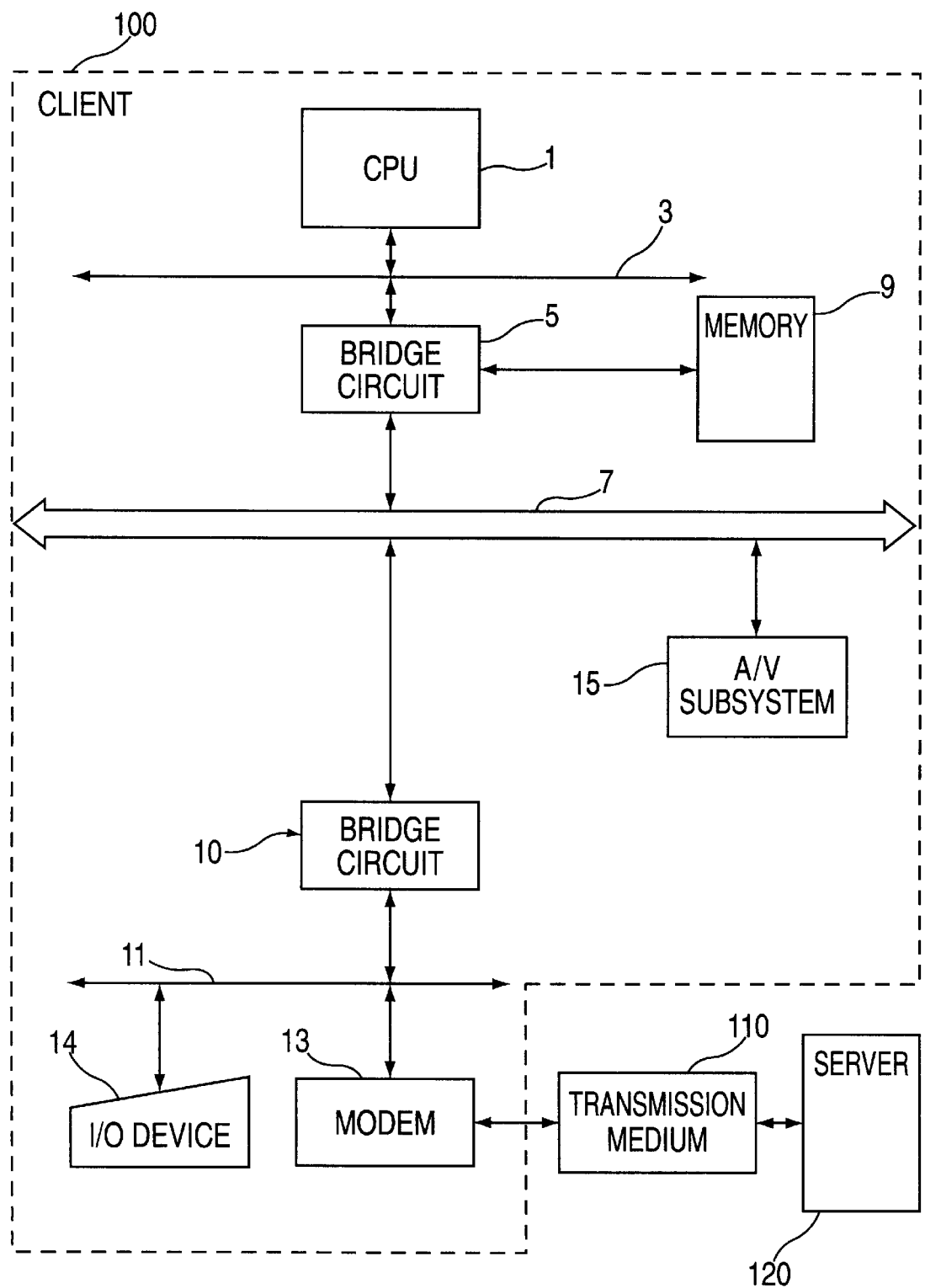
FIG. 1 is a block diagram of a computer system including an audio/video subsystem as is known in the art.

The audio/video subsystems 15', 15" of FIGS. 4 and 7 allow for the input of data for transfer to an end-user via transmission medium 110 (FIG. 1). For example, a microphone 76 (FIG. 4), 150 (FIG. 7) can be provided for the input of audio data and a camera 83 (FIG. 4), 148 (FIG. 7) and video capture component 84 (FIG. 3), 149 (FIG. 4) can be provided for the input of video frame data. Data control information can also be provided as an input via an input/output (I/O) device 14 (FIG. 1) coupled to the data handler 80 (FIG. 4), 146 (FIG. 7).

Though the elements of FIGS. 4 and 7 are shown as being coupled together as a group, one skilled in the art will appreciate that many of the described components can be coupled together via a bus, such as PCI bus 7. Although several embodiments are specifically illustrated and described herein, it will be appreciated that modifications and variations of the present invention are covered by the above teachings and within the purview of the appended claims without departing from the spirit and intended scope of the invention.

What is claimed is:

1. An apparatus for synchronizing data control information with video data, comprising:
    a payload handler adapted to receive a plurality of data packets, each of said data packets including:
        a data payload including one of video data and data control information
        a first header including a timestamp field; and
        a data control header identifying a type of data contained in said data payload;
    a data control filter coupled to said payload handler and adapted to receive said data control header and said data payload for each of said data packets;
    a data handler coupled to said data control filter and adapted to receive data payloads including data control information, said data control information including a command in an action identifier field and said data handler executing said command;
    a video data packet handler coupled to said data control filter and adapted to receive data payloads including video data;
    said payload handler synchronizes a transfer of said video data and data control information to said data control filter based on information in said timestamp field;
    a memory coupled to said data handler;
    a data rendering device coupled to said data handler; and
    a display coupled to said data rendering device wherein said data control information further includes a data object field referencing a file location in said memory and said action identifier field includes a display command such that said data handler displays a file located at said file location at said display via said data rendering device.

2. The apparatus of claim 1 further comprising:
    a video rendering device coupled to said video data packet handler and said display, said video rendering device adapted to output said video data to said display.

3. The apparatus of claim 2 wherein said data packet further includes a payload type field capable of identifying said data payload as audio data, the apparatus further comprising:
    an audio data packet handler coupled to said payload handler and adapted to receive data payloads including audio data; and
    an audio rendering device adapted to receive audio data from said audio data packet handler and output said audio data via a speaker, such that said payload handler synchronizes said a transfer of said audio data to said audio data packet handler and the transfer of video data and data control information to said data control filter based on information in said timestamp field.

4. An apparatus for synchronizing data control information with video data, comprising:
    a payload handler adapted to receive a plurality of data packets, each of said data packets including:
        a data payload including one of video data and data control information
        a first header including a timestamp field;
        a data control header identifying a type of data contained in said data payload; and
        a payload type field capable of identifying said data payload as audio data,
    a data control filter coupled to said payload handler and adaopted to receive said data control header and said data payload for each of said data packets;
    a data cache coupled to said data control filter and adapted to receive data payloads including data control information, said data control information including a command in an action identifier field and said data handler executing said command;
    a video data packet handler coupled to said data control filter and adapted to receive data payloads including video data;
    said payload handler synchronizes a transfer of said video data and data control information to said data control filter based on information in said timestamp field;
    an audio data packet handler coupled to said payload handler and adapted to receive data payloads including audio data; and
    an audio rendering device adapted to receive audio data from said audio data packet handler and output said audio data via a speaker, such that said payload handler synchronizes a transfer of said audio data to said audio data packet handler and the transfer of video data and data control information to said data control filter based on information in said timestamp field.

5. An apparatus for synchronizing data control information with audio data, comprising:
    a payload handler adapted to receive a plurality of data packets, each of said data packets including:
        a data payload including one of audio data and data control information
        a first header including a timestamp field; and
        a data control header identifying a type of data contained in said data payload;
    a data control filter coupled to said payload handler and adapted to receive said data control header and said data payload for each of said data packets;
    a data handler coupled to said data control filter and adapted to receive data payloads including data control information, said data control information including a command in an action identifier field and said data handler executing said command;
    an audio data packet handler coupled to said data control filter and adapted to receive data payloads including audio data;
    said payload handler synchronizes a transfer of said audio data and data control information to said data control filter based on information in said timestamp field;
    a memory coupled to said data handler;
    a data rendering device coupled to said data handler; and
    a display coupled to said data rendering device wherein said data control information further includes a data object field referencing a file location in said memory and said action identifier field includes a display command such that said data handler displays a file at said file location at said display via said data rendering device.

6. The apparatus of claim 5 further comprising:
an audio rendering device coupled to said payload handler and adapted to receive audio data from said audio data packet handler and output said audio data via a speaker.

7. The apparatus of claim 6 wherein said data packet further includes a payload type field capable of identifying said data payload as video data, the apparatus further comprising:
a video data packet handler coupled to said payload handler and adapted to receive data payloads including video data; and
a video rendering device adapted to receive video data from said video data packet handler and output said audio data via a speaker, such that said payload handler synchronizes a transfer of said audio data to said audio data packet handler and the transfer of video data and data control information to said data control filter based on information in said timestamp field.

8. The apparatus of claim 5 wherein said data packet further includes a payload type field capable of identifying said data payload as video data, the apparatus further comprising:
a video data packet handler coupled to said payload handler and adapted to receive data payloads including video data; and
a video rendering device coupled to said video data packet handler and said display, said video rendering device adapted to output said video data to said display, such that said payload handler synchronizes a transfer of said video data to said video data packet handler and the transfer of audio data and data control information to said data control filter based on information in said timestamp field.

9. A method of synchronizing data control information with video data, comprising:
receiving a plurality of data packets at a payload handler, each of said data packets including a data payload including one of video data and data control information, a first header including a timestamp field, and a data control header identifying a type of data contained in said data payload;
transferring said data control header and said data payload for each of said data packets to a data control filter, said payload handler synchronizes the transferring of said video data and data control information to said data control filter based on information in said timestamp field;
determining whether said data payload includes data control information via said data control header;
transferring said data payload to a data handler if said data payload includes data control information, said data control information including a command in an action identifier field and a data object field referencing a file location in a memory and said action identifier field includes a display command;
executing the command in said data control information by said data handler; and
transferring said data payload to a video data packet handler if said data payload includes video data; and
displaying a file stored at said file location in said memory at a display.

10. The method of claim 9 further comprising:
outputting said video data to said display via a video rendering device coupled to said video data packet handler.

11. The method of claim 10 wherein said data packet further includes a payload type field capable of identifying said data payload as audio data, the method further comprising:
transferring data payloads including audio data to an audio data packet handler coupled to said payload handler; and
outputting said audio data to a speaker by an audio rendering device, such that said payload handler synchronizes said transferring of said audio data to said audio data packet handler and the transferring of video data and data control information to said data control filter based on information in said timestamp field.

12. A method of synchronizing data control information with video data, comprising:
receiving a plurality of data packets at a payload handler, each of said data packets including a data payload including one of video data and data control information, a first header including a timestamp field, a data control header identifying a type of data contained in said data payload and a payload type field capable of identifying said data payload as audio data;
transferring said data control header and said data payload for each of said data packets to a data control filter, said payload handler synchronizes the transferring of said video data and data control information to said data control filter based on information in said timestamp field;
determining whether said data payload includes data control information via said data control header;
transferring said data payload to a data handler if said data payload includes data control information, said data control information including a command in an action identifier field;
executing the command in said data control information by said data handler;
transferring said data payload to a video data packet handler if said data payload includes video data;
transferring data payloads including audio data to an audio data packet handler coupled to said payload handler; and
outputting said audio data to a speaker by an audio rendering device, such that said payload handler synchronizes said transferring of said audio data to said audio data packet handler and the transferring of video data and data control information to said data control filter based on information in said timestamp field.

13. A method of synchronizing data control information with audio data, comprising:
receiving a plurality of data packets at a payload handler, each of said data packets including a data payload including one of video data and data control information, a first header including a timestamp field, and a data control header identifying a type of data contained in said data payload;
transferring said data control header and said data payload for each of said data packets to a data control filter, said payload handler synchronizes the transferring of said audio data and data control information to said data control filter based on information in said timestamp field;

determining whether said data payload includes data control information via said data control header;

transferring said data payload to a data handler if said data payload includes data control information, said data control information including a command in an action identifier field, a data object field referencing a file location in a memory and said action identifier field includes a display command;

executing the command in said data control information by said data handler;

transferring said data payload to an audio data packet handler if said data payload includes audio data; and displaying a file stored at said file location in said memory at a display.

14. The method of claim 13 wherein said data packet firther includes a payload type field capable of identifying said data payload as video data, the method further comprising:

transferring data payloads including video data to an video data packet handler coupled to said payload handler; and outputting said video data to said display by a video rendering device, such that said payload handler synchronizes said transferring of said video data to said video data packet handler and the transferring of audio data and data control information to said data control filter based on information in said timestamp field.

15. A method of synchronizing data control information with audio data, comprising:

receiving a plurality of data packets at a payload handler, each of said data packets including a data payload including one of video data and data control information, a first header including a timestamp field, and a data control header identifying a type of data contained in said data payload;

transferring said data control header and said data payload for each of said data packets to a data control filter, said payload handler synchronizes the transferring of said audio data and data control information to said data control filter based on information in said timestamp field;

determining whether said data payload includes data control information via said data control header;

transferring said data payload to a data handler if said data payload includes data control information, said data control information including a command in an action identifier field;

executing the command in said data control information by said data handler;

transferring said data payload to an audio data packet handler if said data payload includes audio data; and outputting said audio data to a speaker via an audio rendering device coupled to said audio data packet handler.

16. The method of claim 15 wherein said data packet further includes a payload type field capable of identifying said data payload as video data, the method further comprising:

transferring data payloads including video data to an video data packet handler coupled to said payload handler; and outputting said video data to said display by a video rendering device, such that said payload handler synchronizes said transferring of said video data to said video data packet handler and the transferring of audio data and data control information to said data control filter based on information in said timestamp field.

* * * * *

UNITED STATES PATENT AND TRADEMARK OFFICE
CERTIFICATE OF CORRECTION

PATENT NO.   : 6,359,656 B1
DATED        : March 19, 2002
INVENTOR(S)  : Jeffrey L. Huckins It is certified that error appears in the above-identified patent and that said Letters Patent is hereby corrected as shown below:

Column 6,
Line 16, "adaopted" should be -- adapted --

Column 9,
Line 17, "firther" should be -- further --
Line 20, "an" should be -- a --

Column 10,
Line 26, "an" should be -- a --

Signed and Sealed this

Fourth Day of March, 2003

JAMES E. ROGAN
*Director of the United States Patent and Trademark Office*